Feb. 13, 1951     E. F. ANDREWS     2,541,681
RATTRAP
Filed July 31, 1944
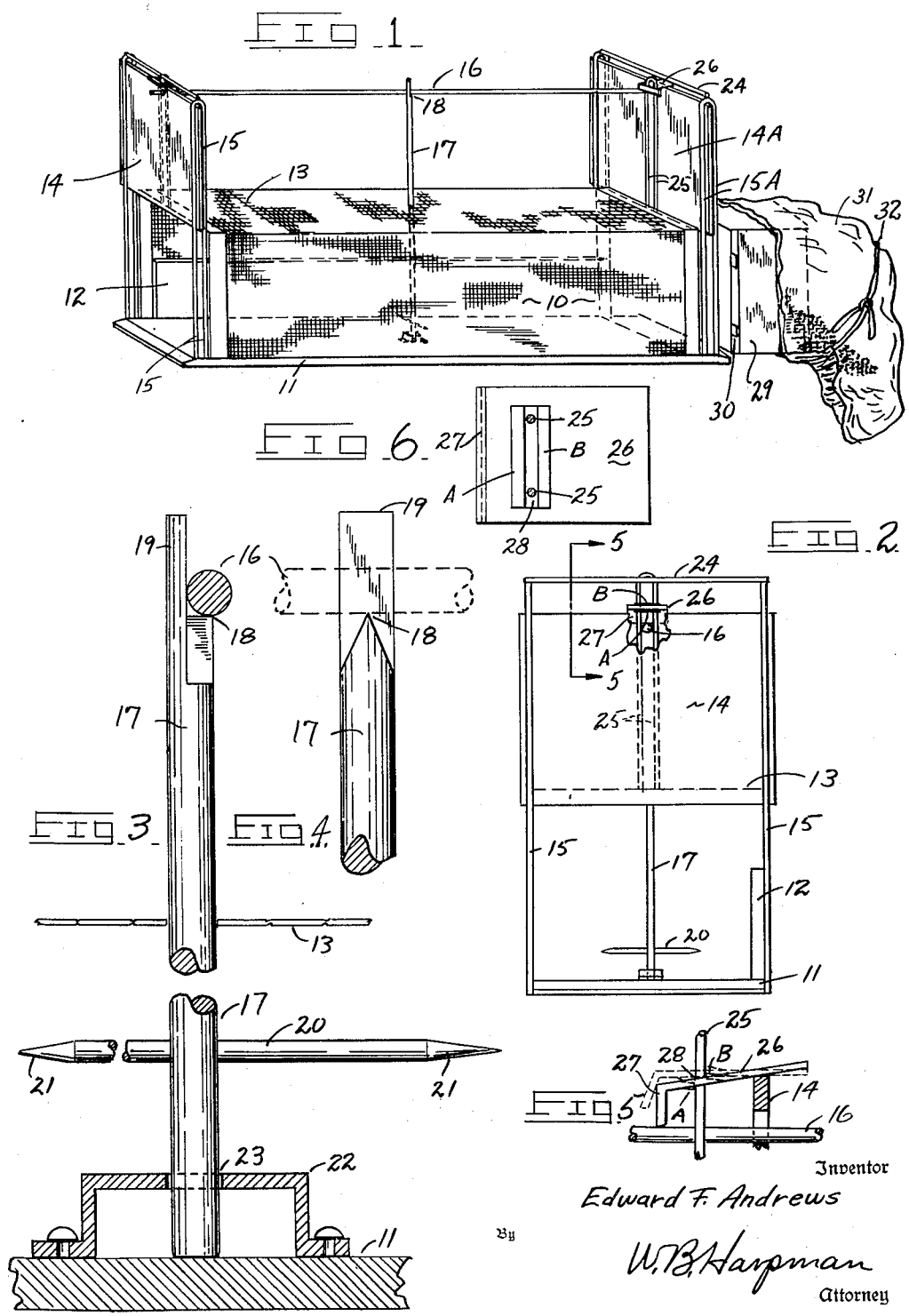
Inventor
Edward F. Andrews
By
W. B. Harpman
Attorney Patented Feb. 13, 1951

2,541,681

UNITED STATES PATENT OFFICE 2,541,681

RATTRAP

Edward F. Andrews, Youngstown, Ohio

Application July 31, 1944, Serial No. 547,425

1 Claim. (Cl. 43—61)

This invention relates to a trap and more particularly to a trap designed for trapping rats.

The principal object of the invention is the provision of a rat trap provided with double doors simultaneously operated from a single trigger member.

A further object of the invention is the provision of a rat trap formed to provide a reasonable degree of cover to induce a rat to enter the same.

A still further object of the invention is the provision of a trigger for a rat trap whereby a slight motion of the same serves to cause the trap to close.

A still further object of the invention is the provision of a killing attachment used in combination with the primary trap structure for the removal and disposal of rats trapped therein.

The rat trap shown and described herein constitutes an improvement over that shown and described in my co-pending application for Patent Serial No. 514,580 filed December 15, 1943, now Patent No. 2,374,522 and has been designed to form an efficient yet simple trap structure which may be successfully used in trapping rats which have become familiar with various other forms of traps and thereby cautious and exceedingly difficult to entrap.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective view illustrating the rat trap and the disposal portion.

Fig. 2 is an enlarged end elevation of the rat trap shown in Figure 1 with parts broken away.

Figure 3 is an enlarged detailed view with parts broken away illustrating the trigger member of the trap shown in Figure 1.

Figure 4 is a side elevation of the uppermost portion of the trigger member illustrated in Figure 3.

Figure 5 is a cross section on an enlarged scale of a portion of the device illustrated in Figures 1 and 2 and taken on line 5—5 of Figure 2.

Figure 6 is a top plan view of a portion of the device illustrated in Figure 5 with part in section.

By referring to the drawings and Figures 1 and 2 in particular it will be seen that a rat trap has been disclosed wherein a box-like body member 10 forms the primary trapping structure and is itself formed with a base 11 preferably wooden, an unbroken low side wall 12 and full side walls and a top 13 formed of wire mesh. It will be observed that the base 11 and the low side wall 12, being unbroken, provide a fair degree of shelter or cover along one side of the trap structure which is otherwise largely formed of the screen wire mesh. The ends of the box-like trap 10 are normally open and are adapted to be simultaneously closed by a pair of doors 14 and 14A, respectively, which are positioned for vertical travel by means of duplicate pairs of vertically positioned guides 15 and 15A, each of which forms in effect a frame immediately adjacent the normally open ends of the box-like trap 10 and which provide guide means for the doors 14 and 14A which are slidably positioned therein. It will be observed that the guides 15 and 15A extend above the wire mesh top 13 of the box-like trap 10 a distance equal to the height of the box-like trap 10 itself to permit the doors to be positioned above the normally open ends of the trap and thereby offer an unobstructed view therethrough. The doors 14 and 14A are normally held in elevated position in the guides 15 and 15A by means of a longitudinally positioned support bar 16, the opposite ends of which extend through appropriately sized openings in the doors 14 and 14A near their uppermost edges to enable them to be supported thereby. In order that the support bar 16 may itself be held in elevated position, a vertically positioned, rotatably mounted trigger member 17 is located in the center section of the trap 10 and extends upwardly through the wire mesh top 13 thereof and is provided near its uppermost end with a cut away and tapered section as best illustrated in Figures 3 and 4 of the drawings. By referring thereto it will be seen that the supporting bar 16 is normally positioned on a shoulder or apex 18 of the tapered part of the cut away portion of the trigger member 17 and that at such time as the trigger member 17 is partially rotated the uncut half section of the trigger member 17 will move the support bar 16 sidewardly and away from its support on the shoulder or apex 18 of the tapered portion of the trigger member 17. When this occurs the support bar 16 will fall by gravity and the doors 14 and 14A which have been supported on the opposite ends of the support bar 16 will likewise fall thereby closing the trap. In order that such rotating motion can be imparted to the trigger member by a rat, a transversely positioned bait rod 20 is formed on the trigger member 17 near the lower end thereof and this rod 20 is provided with tapered points 21 upon which suitable bait may be positioned. It will thus be seen that a rat attempting to take the bait will move the rod 20 and hence rotate the vertically positioned trigger member 17 and thereby cause the release of the support bar 16 and the closing of the trap doors 14 and 14A. The bottom of the trigger member 17 is preferably mounted on the base 11 of the trap by means of a bracket 22 having a centrally positioned opening 23 thereon through which the vertically positioned trigger member 17 is positioned. The bracket 22 is affixed to the base 11 by any suitable means.

By referring again to Figure 2 of the drawings it will be seen that each of the guides 15 and 15A comprises a pair of vertically positioned guide members affixed to the base 11 at their lowermost ends and spaced by a spacer rod 24 at their uppermost ends. Each of the guide structures includes a centrally located vertically positioned secondary guide 25, which is above the wire mesh top 13 of the trap, being positioned vertically on the body member 10 and which serves as a guide for each of the protruding ends of the support bar 16 which is positioned therebetween, thus preventing sideward travel of the doors 14 and 14A so as to insure their retention between the guides 15 and 15A, respectively. Each of the guides 25 also forms a part of a locking means which serves to lock the doors 14 and 14A in closed position on the trap 10. The locking means consists of a pair of clips 26 each of which is provided with a downwardly turned flange 27 and a slot-like opening 28 which enables it to be positioned on the guide 25 as illustrated in Figure 2. In Figure 5 a side elevation of one of the clips 26 may be seen in latched position and it will be observed that the edge of the material of the clip 26 defining the slot 28 therein nearest the depending flange 27 is bent downwardly as at A while the opposite edge of the material is bent upwardly as at B. The clips 26 are adapted to rest upon the top of one of the doors 14 or 14A, a portion of one of which is shown in Figure 5 and the downwardly and upwardly formed edges A and B of the slot 28 cause the clip 26 to latch upon the vertically positioned guide 25 which is positioned through the slot 28 when any attempt is made to raise the door. The edge of the downwardly depending flange 27 of each of the clips 26 is adapted to rest upon the upper surface of the bar 16 adjacent its ends so that when the bar 16 is moved upwardly for lifting the doors 14 and 14A it will tilt the clips 26 by lifting the flanged edge of the clips 26 upwardly so as to release the latching action of the downwardly and upwardly formed edges A and B of the clips 26 with respect to the guides 25. This action holds the clips 26 in approximately horizontal position and thereby permit them to slide up the guide members 25. Further upward movement of the bar 16 will move the doors 14 and 14A with their respective clips upwardly as a unit. It will thus be seen that once the trigger member 17 is moved by a rat taking bait on one of the points 21 of the bait rod 20, the support bar 16 is caused to drop thereby releasing the doors 14 and 14A which close. The clips 26 slide down the guides 25 and immediately latch the doors 14 and 14A in closed position. Dotted lines in Figure 5 illustrate the unlatched position of the clip 26.

By referring again to Figure 1 and to the right hand portion thereof it will be observed that a detachable disposal device has been illustrated to facilitate the removal of rats trapped in the trap 10. The disposal means consists of a frame 29 provided with clamps 30, one pair of which are spring pressed to enable the frame 29 to be attached to the trap 10 by engagement with the vertically positioned guides 15 or 15A. A sack-like member 31 is attached to the frame 29 and is provided with a drawstring or rope 32. When attached by means of the clamps 30 to the trap 10 the adjacent door 14 or 14A of the trap is raised and the trapped rat is permitted to enter the sack-like member 31. It has been determined that a rat seeking cover and seeking to escape from the trap itself invariably runs into the far end of the sack 31. It is then a simple matter to pull the drawstring or rope 32 tight and dispose of the rat in the sack 31 by clubbing, drowning or by any other means.

As set forth in the objects of this invention, this means of disposing of the trapped rats enables the trap itself to remain uncontaminated and thus free of any odors or other indications of its purpose which, it has been determined, would warn away other rats. The invention, therefore, contemplates the combination of the trap and the disposal means, as, when used in combination, they enable the continued satisfactory employment of the trap whereas otherwise its purpose is soon marked and made apparent to rats which would subsequently avoid the trap and thereby defeat its purpose. It has been determined that when the trap and the disposal member are used in combination as hereinbefore set forth the trap may be used continuously successfully.

Having thus described my invention, what I claim is:

In a rat trap including a cage-like housing having an opening at each end thereof, guide structures positioned at each of the said openings and a door positioned in each of the said guide structures and capable of vertical travel therein, trigger means for holding the said doors in elevated position in the said guide structures and means for each door for locking the said doors in lowered position in the said guide structures, each of said locking means comprising a slotted clip slidably engaging a portion of the said guide structure and resting on the door in the said guide structure.

EDWARD F. ANDREWS.

REFERENCES CITED

The following references are of record in the file of this patent:

UNITED STATES PATENTS

| Number | Name | Date |
| --- | --- | --- |
| 187,159 | Mason et al. | Feb. 6, 1877 |
| 196,436 | Crawford | Oct. 23, 1877 |
| 199,987 | McGuire | Feb. 5, 1878 |
| 210,071 | Wiesedeppe | Nov. 19, 1878 |
| 428,966 | Shaw | May 27, 1890 |
| 666,913 | Tyler | Jan. 29, 1901 |
| 777,342 | Homer | Dec. 13, 1904 |
| 821,645 | Johnson | May 29, 1906 |
| 925,042 | Shaw | June 15, 1909 |
| 2,374,522 | Andrews | Apr. 24, 1945 |